(12) United States Patent
Gazda et al.

(10) Patent No.: US 7,409,682 B2
(45) Date of Patent: Aug. 5, 2008

(54) SOFTWARE PORTING LAYER

(75) Inventors: Robert Gazda, Spring City, PA (US); Scott Hergenhan, Collegville, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 440 days.

(21) Appl. No.: 10/648,663

(22) Filed: Aug. 26, 2003

(65) Prior Publication Data

US 2004/0205754 A1 Oct. 14, 2004

Related U.S. Application Data

(60) Provisional application No. 60/405,995, filed on Aug. 26, 2002.

(51) Int. Cl.
*G06F 9/45* (2006.01)

(52) U.S. Cl. .................. 717/147; 718/102; 718/107

(58) Field of Classification Search .......... 717/137, 717/138, 139, 120, 149, 147; 718/100, 102, 718/107, 108, 168–178, 120–122
See application file for complete search history.

(56) References Cited

U.S. PATENT DOCUMENTS

| | | | |
|---|---|---|---|
| 5,493,692 A * | 2/1996 | Theimer et al. ............. 455/26.1 |
| 5,555,416 A * | 9/1996 | Owens et al. ................. 717/178 |
| 5,946,487 A * | 8/1999 | Dangelo ........................ 717/148 |
| 6,029,000 A | 2/2000 | Woolsey et al. |
| 6,226,788 B1 * | 5/2001 | Schoening et al. ........... 717/107 |
| 6,256,637 B1 | 7/2001 | Venkatesh et al. |
| 6,256,775 B1 * | 7/2001 | Flynn .......................... 717/127 |
| 6,263,213 B1 * | 7/2001 | Kovacs ........................ 455/550.1 |
| 6,272,519 B1 | 8/2001 | Shearer et al. |
| 6,407,751 B1 * | 6/2002 | Minami et al. .............. 715/736 |
| 6,493,740 B1 * | 12/2002 | Lomax ........................ 718/107 |
| 6,505,228 B1 * | 1/2003 | Schoening et al. .......... 718/106 |
| 6,606,742 B1 * | 8/2003 | Orton et al. .................. 717/140 |
| 6,628,965 B1 | 9/2003 | LaRosa et al. |
| 6,631,516 B1 * | 10/2003 | Baumgart et al. ........... 717/143 |
| 6,711,739 B1 * | 3/2004 | Kutcher ......................... 718/1 |
| 6,721,945 B1 * | 4/2004 | Sinha ........................... 717/157 |
| 6,721,949 B1 | 4/2004 | Tavoletti et al. |
| 6,725,451 B1 * | 4/2004 | Schuetz et al. .............. 717/151 |
| 6,754,885 B1 * | 6/2004 | Dardinski et al. ........... 717/113 |
| 6,757,904 B1 | 6/2004 | Woodruff et al. |
| 6,804,682 B1 * | 10/2004 | Kemper et al. .......... 707/103 R |

(Continued)

FOREIGN PATENT DOCUMENTS

WO 00/74368 12/2000

OTHER PUBLICATIONS

"Software Portability", Oliver LeCarme et al, Mc Graw-Hill Compnay, New York, 1986, pp. 1-219.*

(Continued)

*Primary Examiner*—Todd Ingberg
(74) *Attorney, Agent, or Firm*—Volpe and Koenig, P.C.

(57) ABSTRACT

A porting layer takes software developed using a single threaded modeling tool to a multiple threaded environment. The single threaded modeling tool is used to model the software. The porting layer ports in variables into a multiple threaded operating environment by reference and not as variables so that each thread can access variables by reference.

5 Claims, 10 Drawing Sheets

U.S. PATENT DOCUMENTS

| | | | | |
|---|---|---|---|---|
| 6,807,548 | B1* | 10/2004 | Kemper | 707/103 R |
| 6,813,764 | B2* | 11/2004 | Stoodley | 717/153 |
| 6,842,433 | B2* | 1/2005 | West et al. | 370/312 |
| 6,851,110 | B2* | 2/2005 | Hundt et al. | 717/159 |
| 6,854,108 | B1* | 2/2005 | Choi | 717/125 |
| 6,856,950 | B1* | 2/2005 | Abts et al. | 703/13 |
| 6,901,587 | B2* | 5/2005 | Kramskoy et al. | 717/154 |
| 6,920,634 | B1* | 7/2005 | Tudor | 718/107 |
| 6,952,825 | B1* | 10/2005 | Cockx et al. | 718/102 |
| 6,954,922 | B2* | 10/2005 | Liang | 717/130 |
| 6,968,541 | B1* | 11/2005 | Hanson et al. | 717/136 |
| 6,976,253 | B1* | 12/2005 | Wierman et al. | 717/177 |
| 7,028,305 | B2 | 4/2006 | Schaefer | |
| 7,039,738 | B2* | 5/2006 | Plummer et al. | 710/260 |
| 7,062,766 | B2* | 6/2006 | Ronkka et al. | 718/100 |
| 7,082,432 | B2* | 7/2006 | Bhogi et al. | 707/10 |
| 7,082,604 | B2* | 7/2006 | Schneiderman | 718/100 |
| 7,162,718 | B1* | 1/2007 | Brown et al. | 718/1 |
| 7,174,554 | B2* | 2/2007 | Pierce et al. | 718/107 |
| 2001/0027464 | A1 | 10/2001 | Tavoletti et al. | |
| 2002/0006137 | A1 | 1/2002 | Rabenko et al. | |
| 2002/0091800 | A1 | 7/2002 | Wilkinson et al. | |
| 2002/0174215 | A1 | 11/2002 | Schaefer | |
| 2003/0233647 | A1 | 12/2003 | Blaser et al. | |
| 2004/0025042 | A1 | 2/2004 | Kouzznetsov et al. | |
| 2004/0054821 | A1 | 3/2004 | Warren et al. | |
| 2004/0162103 | A1 | 8/2004 | Montes | |

OTHER PUBLICATIONS

Software Portability with imake, Paul DuBois, Second Edition, O'Reilly & Assoc., 1996, pages Whole Manual.*

Nu-Mega Technologies, Inc. (Company Literature), Bounds-Checker User's Guide ,, Chapter 6, "Customizing Data Checking with Routine-Dat", pp. 75-83, printed Jul. 21, 1998.*

"Porting The GNU C Compiler for Dummies", Hans-Peter Nilsson, Dec. 1, 1998, 96 pages.*

"Portable Compiler Eases Problems of Software Migration", Lowell Wolf et al, System Design/ Software, 1984, pp. 147-153.*

"Adding Run-Time Checking to the Portable C Compiler", Joseph L. Steffen, John Wiley & Sons, Oct. 21, 1991, pp. 305-316.*

"A Portable Assembler Reverse Engineering Environment (PARE)", Susan N. Roberts et al, IEEE WCRE'96, 1996, pp. 76-85.*

"Writing Solid Code". Steve Maguire, Microsoft Press, 1993, pp. 111-117.*

"iMobile: A Proxy-Based Platform for Mobile Services", Chung-Hwq Herman Rao, et al, ACM, 2001, pp. 3-10.*

"A Pre-Serialization Transaction Management Technique For Mobile Multidatabases" Ravi A. Dirckze et al, 2000, Mobile Networks and Applications, pp. 311-321.*

Wireless Convergence Architecture: A Case Study Using GSM and Wireless LAN, Nikos A. Nikolaou et al, Mobile Networks and Applications, 2002, 259-267.*

I2O Special Interest Group "Intelligent I/O (I20) Architecture Specification Version 2.0", Online!, Mar. 1999, pp. 1-98, http://embedded.ifmo.ru/lib/DOC/RTOS/I2O/V2.0_Spec.pdf.

Ryan, "Synchronization in Portable Device Drivers", Operating Systems Review (SIGOPS), ACM Headquarters, vol. 32, No. 4, Oct. 1998, pp. 62-69.

National Semiconductor, Santa Clara, California, "DS90CR211/DS90CR212 21-Bit Channel Link", USA, XP002306540; URL:http://www/national.com/ds/DS/DS90CR211.pdf, pp. 1-2; figure 13.

Novak T et al., "Channel Link-Moving and Shaping Information In Point-to-Point Applications", May 1996, National Semiconductor, Santa Clara, California, USA, XP002306541, URL:http://www.natiional.com/an/AN/AN-1041.pdf, pp. 1-2, figures 1-5.

Von Herzen B et al., "Multi-Channel 622 Mb/s LVDS data Transfer for Virtex-E Devices", Jan. 6, 2001, Xilinx Inc., San Jose, California, USA XP002306542, URL://http://direct.xilinx.com/bvdocs/appnotes/xapp233.pdf, pp. 1-5, figures 1-3, and 6.

Kitanowska S et al, Bus LVDS with Virtex-E Devices: Jul. 26, 2000, Xilinx Inc., San Jose, California, USA, XP002307032, URL: http://direct.xilinx.com/bvdocs/appnotes/xapp243.pdf.

* cited by examiner

| PROCESS ID | | TRANSITION ID | |
|---|---|---|---|
| 0000 | | 0000 | START |
| | | 0001 | |
| FFFC | | FFFC | |
| FFFD | TIMER * | FFFD | DISCARD |
| FFFE | ENV | FFFE | SAVE |
| FFFF | NULL | FFFF | NULL |

| SIGNAL ID | | STATE ID | |
|---|---|---|---|
| 0000 | START | 0000 | ASTERISK |
| 0001 | | 0001 | |
| FFFE | | FFFD | |
| FFFF | ASTERISK | FFFE | DORMANT |
| | | FFFF | START |

SOFTWARE PORTING LAYER

CROSS REFERENCE TO RELATED APPLICATION(S)

This application claims priority from U.S. provisional application No. 60/405,995, filed Aug. 26, 2002, which is incorporated by reference as if fully set forth.

FIELD OF INVENTION

This invention generally relates to wireless devices. In particular, the invention relates to developing software to run on hardware of such devices.

BACKGROUND

Developing software to effectively use hardware, such as communication processors and system processors, of wireless devices is difficult. Wireless devices have limited memory storage capacity, making it desirable that software operating systems, interfaces and applications have a small footprint. However, using reduced footprint software design techniques limits the flexibility accorded to software designers.

To illustrate, one tool for producing software modeling language SDL code is TELELOGIC TAU. That tool allows for software programmers to produce a model of the software and the tool produces code from the model. TELELOGIC TAU has two potential code generators, C ADVANCED and C MICRO. C ADVANCED allows a software designer to use all the features of SDL. C MICRO limits the available features with the advantage of producing a smaller code footprint.

TELELOGIC TAU supports both light and tight integration. In light integration, the entire SDL system executes in a single thread. In tight integration, each SDL process becomes a thread. To minimize the code footprint, C MICRO is desirable to be used. However, C MICRO only supports light integration and, accordingly, multiple threads of execution are not supported. Accordingly, it is desirable to have code with a reduced footprint that supports multiple threads of execution.

SUMMARY

A porting layer takes software developed using a single threaded modeling tool to a multiple threaded environment. The single threaded modeling tool is used to model the software. The porting layer ports in variables into a multiple threaded operating environment by reference and not as variables so that each thread can access variables by reference.

DETAILED DESCRIPTION OF THE PREFERRED EMBODIMENT(S)

Figure 1:
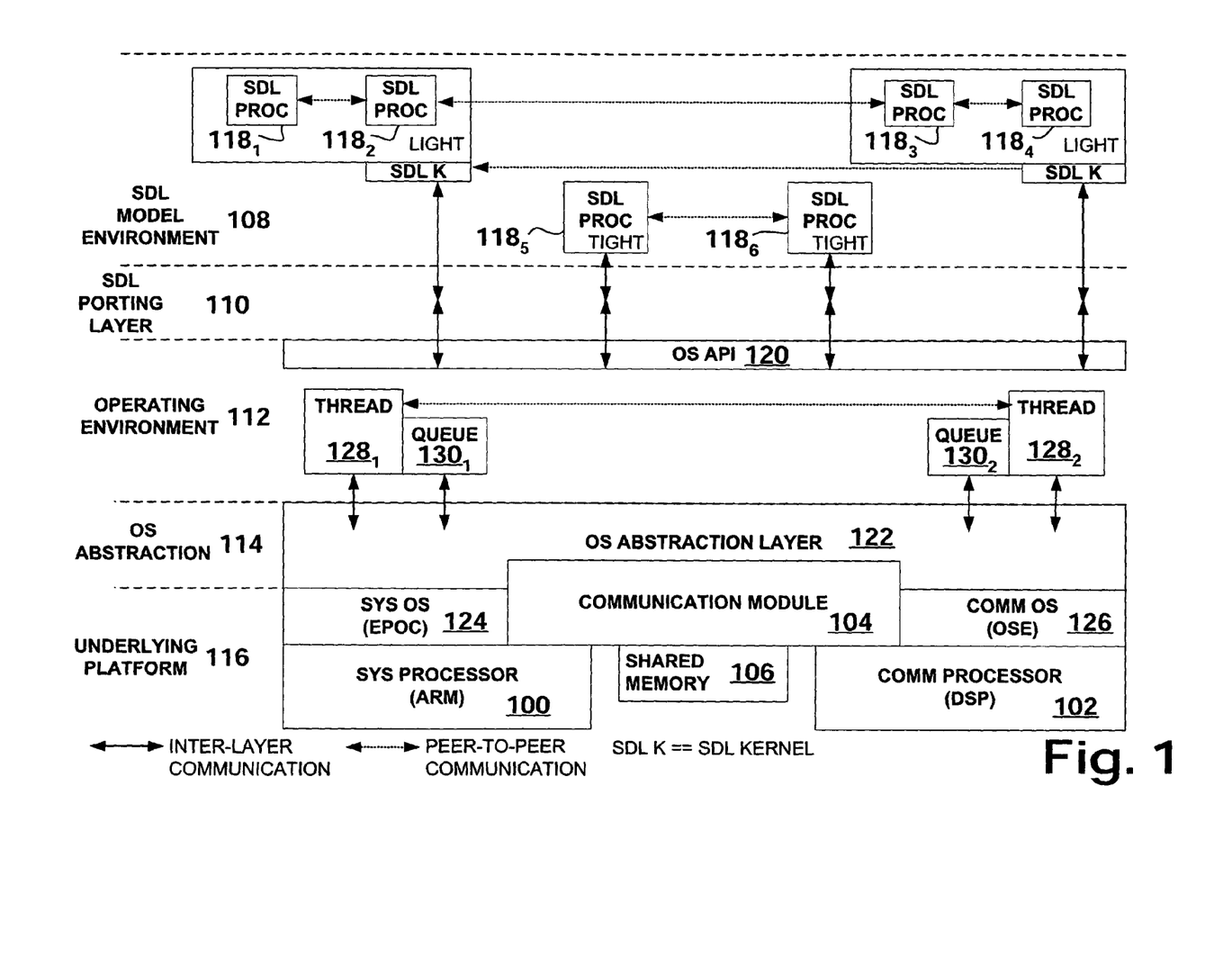
FIG. 1 is a simplified diagram of one configuration of a wireless device with software and programmers interface illustrated.

FIG. 1 is a simplified diagram of one configuration of a wireless device with software and programmers interface also illustrated. One such wireless device is a wireless transmit/receive unit. A wireless transmit/receive unit (WTRU) includes but is not limited to a user equipment, mobile station, fixed or mobile subscriber unit, pager, or any other type of device capable of operating in a wireless environment. Although the preferred embodiment uses the hardware configuration of FIG. 1, alternate hardware configurations can be used with the wireless device software.

The wireless device has a system processor 100, such as a RISC. The system processor 100 typically runs the system applications, such as web browsing, calendars, etc. A communication processor 102, such as a DSP, typically runs the wireless communication protocols. A communication module 104 allows for communication between the system and communication processor. A shared memory 106 is accessible by both processors 100 and 102 via the communication module 104.

FIG. 1 also illustrates the preferred software structure of the wireless device and its association with the hardware. The SDL model layer 108 represents the communication protocol stack components at very high level of abstraction. The SDL model environment 108 is composed of SDL processes $118_1$ to $118_6$ (118) communicating at a peer-to-peer level via SDL signals. SDL model elements (processes and signals) are transformed into operating environment elements by targeting the code generator to the operating system adaptive port interface (OS API) 120.

The SDL porting layer 110 represents the conversion of SDL model elements (processes, signals, partitions, etc.) into operating environment constructs through the OS API 120. The operating environment 112 provides an OS/hardware independent environment via the OS API 120. The OS abstraction layer 114 implements the OS API 120 for a particular underlying operating system and hardware platform. It maps the OS API 120 constructs into their underlying OS representations.

The OS abstraction layer 122 interfaces with the communication module 104 to support inter-processor communication. The communication module 104 provides the communication path between the OS API threads $128_1$ to $128_2$ (128) across the system/communication processor boundary and is responsible for the transfer for both data and control. As shown in FIG. 1, a queue $130_1$ to $130_2$ (130) is associated with each thread 128. The communication module 104 provides the communication path between OS API threads across the system/communication processor boundary. It is responsible for the transfer of both data and control. A system OS 124 is associated with the system processor 100 and the communication OS 126 is associated with the communication processor 102.

Although, all of the layers work together in the preferred software structure, each layer can be typically used with other layers in alternate software structures.

Figure 2:
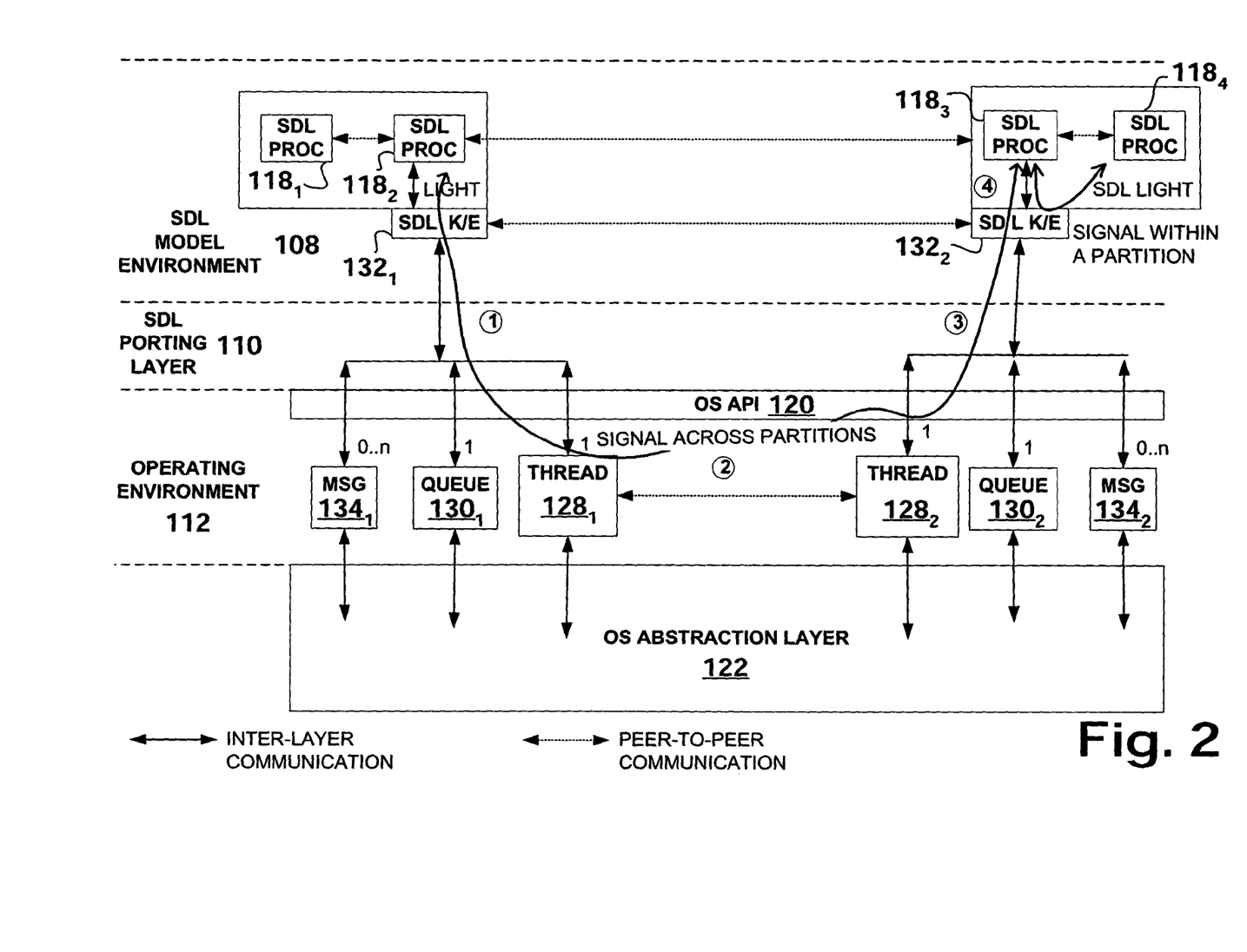
FIG. 2 is an illustration of messaging between SDL processes using light integration across partitions.
Figure 3:
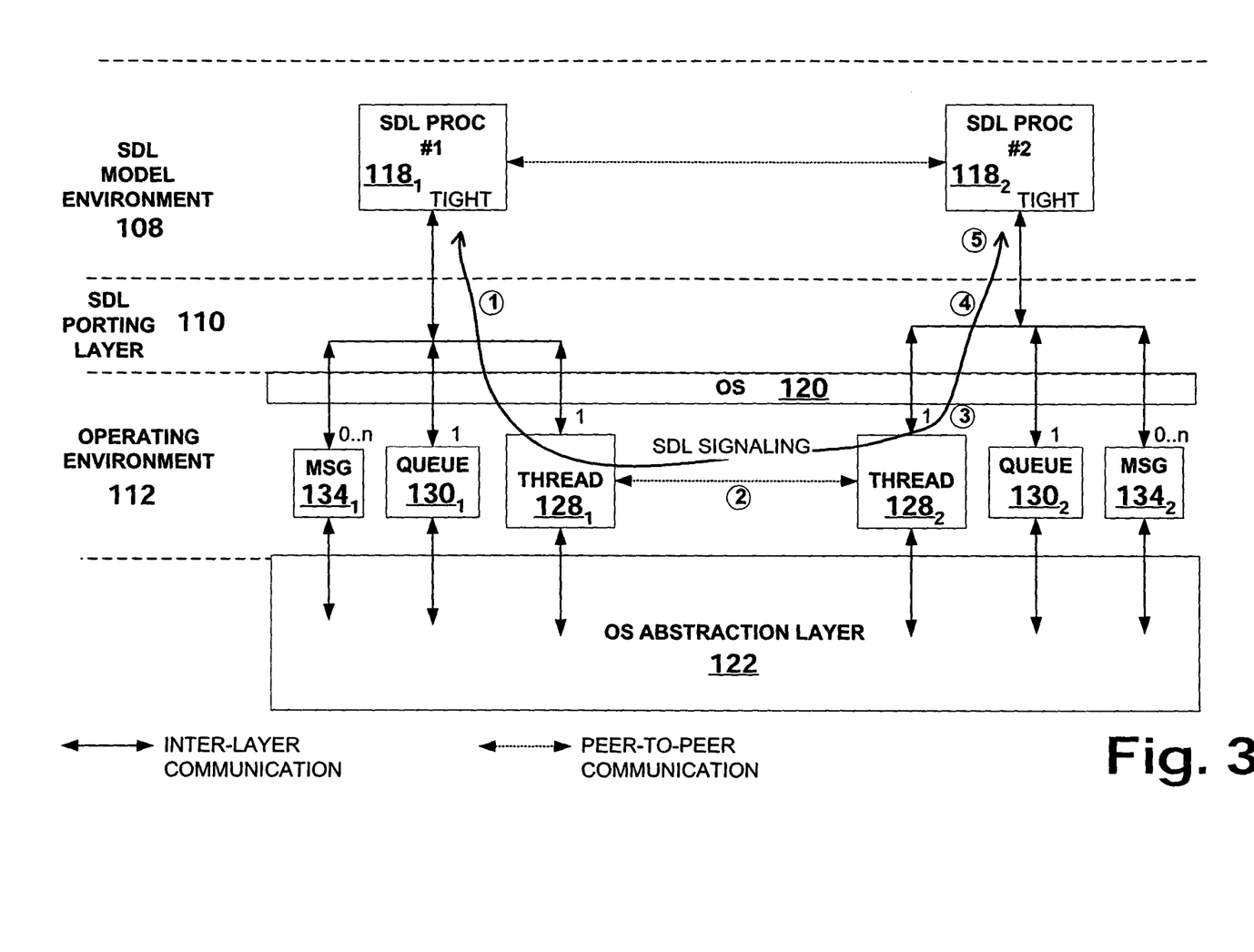
FIG. 3 is an illustration of messaging between SDL processes within a partition using tight integration.
Figure 4:
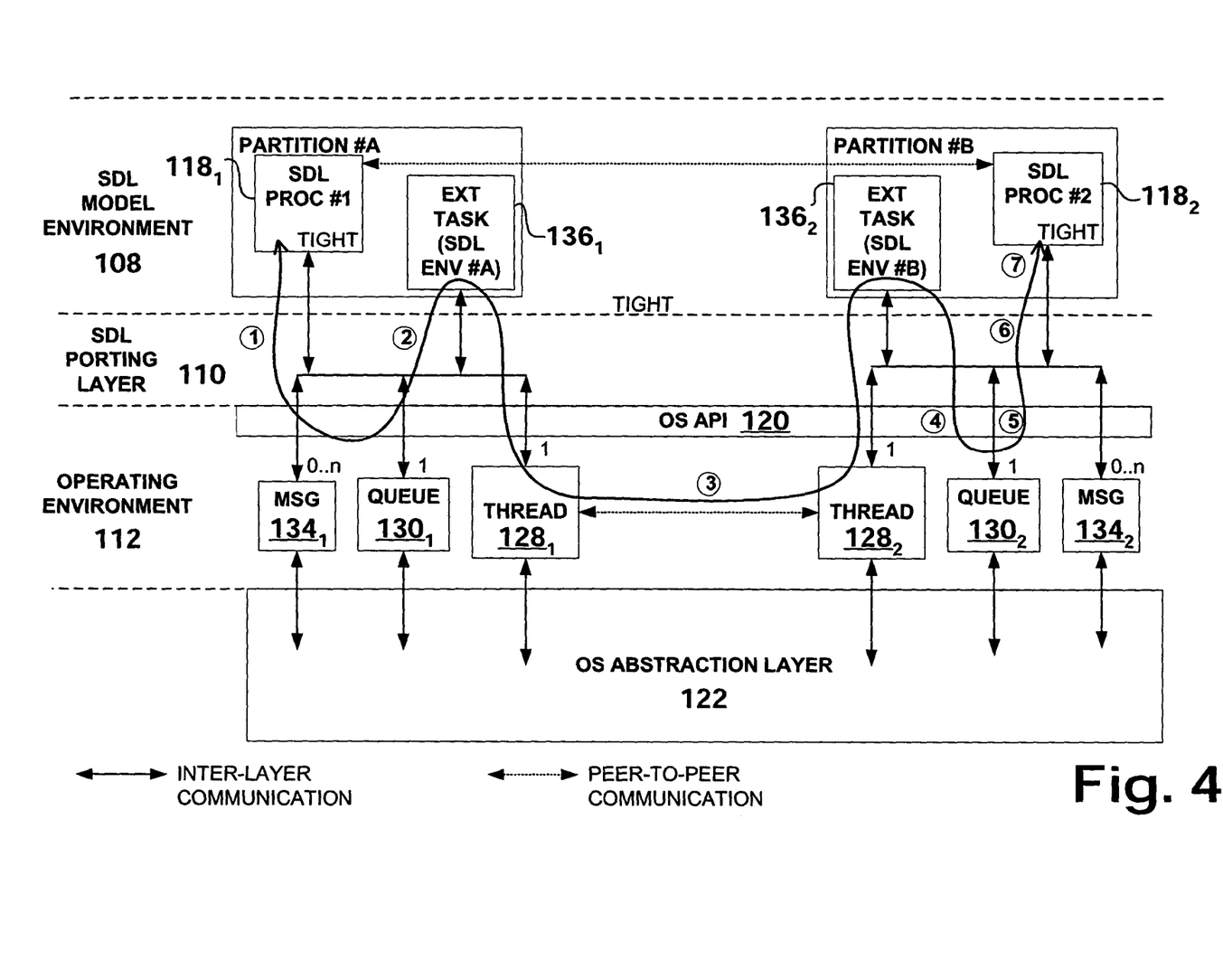
FIG. 4 is an illustration of messaging between SDL processes across partitions using tight integration.

FIGS. 2 to 4 illustrate of communication between SDL processes 118. FIG. 2 is an illustration of messaging between SDL processes 118 using light integration. SDL processes 118 execute on top of an SDL Kernel (K/E) $132_1$ to $132_2$ (132). The SDL kernel 132 manages communication between the processes 118, routing signals to their appropriate recipients. The SDL model 108 may be divided into separate light integration partitions. Each partition contains its own SDL kernel 132, and resolves to a single thread 128 with a queue 120 within the operating environment 112. Each partition's SDL kernel 132 manages communication between internal SDL processes 118 without OS assistance. The SDL kernel 132 forwards signals destine for SDL processes 118 external to its partition through the operating environment 112 via messages $134_1$ to $134_2$ (134).

Initially, the signal from one SDL process $118_2$ is converted to an OS message by the SDL kernel $132_1$ in a first environment. The message is routed to an SDL kernel $132_2$ in a second environment. In other words, the message is "put" in the second environments queue $130_2$. The SDL kernel $132_2$ in the second environment detects the message, and converts the received message back to its signal format. The second environment SDL kernel $132_2$ signals the appropriate process.

Fundamentally, each SDL light integration partition resolves to a thread with a single message queue within the operating environment. Communication between partitions occurs via messaging. Each SDL kernel/environment knows what SDL processes 118 are internal, and what SDL processes 118 are external. Each SDL kernel/environment knows where to route external signals (i.e. what partition their recipient resides) and each SDL kernel/environment knows how to convert signals to messages, and vice versa.

FIG. 3 is an illustration of messaging between SDL processes 118 within a partition using tight integration. Using tight integration, the SDL model 118 maps directly to the operating environment 112. All SDL process communication (signaling) takes place through the operating environment 112. The SDL kernel (SDL process scheduler) is not included using tight integration. Specifically, each SDL process resolves to a thread 128 with a single message queue 130 within the operating environment 112. Communication between SDL processes 118 takes place through the operating environment 112. The SDL porting layer 110 converts signals to messages 134, and vice versa.

For a first SDL process $118_1$ to signal a second SDL process $118_2$, the first process $118_1$ converts the signal into an OS message. That message is routed to the second SDL process thread $128_2$ via its message queue $130_2$. That SDL Process thread $128_2$ wakes up on the message and the message is converted back to a SDL signal. The second SDL Process $118_2$ receives the signal from first SDL Process $118_1$.

FIG. 4 is an illustration of messaging between SDL processes across partitions using tight integration. For a first SDL process $118_1$ to signal a second SDL process $118_2$, the first process $118_1$ converts the signal into an OS message. That message is routed to the first partition external task $136_1$. This environment is the environment acting as a proxy for all processes external to this partition. That partition external task $136_1$ forwards the message (signal) to the second partition External Task $136_2$. The second partition external task $136_2$ routes the message (signal) to the second process thread $128_2$ via its message queue $130_2$. That thread wakes up on the message. The message is converted back to a SDL signal and the second SDL process $118_2$ receives the signal from the first SDL process $118_1$.

This procedure facilitates talking across processor boundaries. The partitions can by targeted to a specific processor and to function across the boundaries external tasks 136 may be used.

Abbreviations
ADT—Abstract Data Type
API—Application Programmer's Interface (Client Interface in this context)
CPU—Hardware (HW) Processor: system RISC (such as an ARM) or DSP.
IPC—Inter-processor Communication
OS—Operating System
HAL—Hardware Abstraction Layer
HW—Hardware
MUX—Mutex
SoC—System-On-a-Chip
SW—Software In the preferred embodiment, an SDL porting layer 110 is used. The preferred SDL porting layer allows for software modeled using a single threaded code generation tool to run as multi-threaded software. The most preferred application is to code generated using C MICRO light integration of TELELOGIC TAU. The SDL porting layer 110 effectively converts the light integration (single thread) to a tight integration (multiple threads). The most preferred application allows for reduced code footprint (C MICRO, light integration) with the added benefits a multi-threaded environment.

In the preferred embodiment, an SDL porting layer 110 is used. The preferred SDL porting layer allows for software modeled using a single threaded code generation tool to run as multi-threaded software. The most preferred application is to code generated using C-Micro light integration of Telelogic Tau. The SDL porting layer 110 effectively converts the light integration (single thread) to a tight integration (multiple threads). The most preferred application allows for reduced code footprint (C-micro, light integration) with the added benefits a multi-threaded environment.

In other embodiments, the other tools can be used without the SDL porting layer. Additionally, aspects of the SDL porting layer can be used with other single thread code generation tools as well as multi-thread code generation tools other than C MICRO.

The basic requirement of the porting layer 110 is to produce the same SDL system behavior as the SDT provided C MICRO kernel. This includes the ability to support the following SDL model features (SDT-imposed restrictions in parentheses).

SDL Feature:
Multiple processes
   Send-Via signals (no output via all)
   Send-To signals
   Deferred signals
   Multiple instances of a process (finite number only)
   Asterisk input, asterisk state
   Timers (integer duration only)
   Signal w/parameters (no omission of parameters in a signal input)
   Timer w/parameter (one integer parameter only)
   Dynamic process creation (no formal parameters)
   Procedure (no inheritance, no states, no nested procedure call data scope)
   Service
   Predefined Types
   (No RPC)
   (No Service and Priority Input and Output)
   (No Export/Import, View/Reveal)
   (No Enabling condition/Continuous signal)
   (No Any Expression)
   (No Macros)
   (No channel substructure)

(Names of processes within different blocks must be different)

The options chosen for the preferred code generation are as follows, although others may be used.

Analyze & generate code (only)
Code generator: C MICRO
Prefix: Full
Separation: Full
Capitalization: As defined The options chosen for the preferred code generation are as follows, although others may be used.

Figure 5:
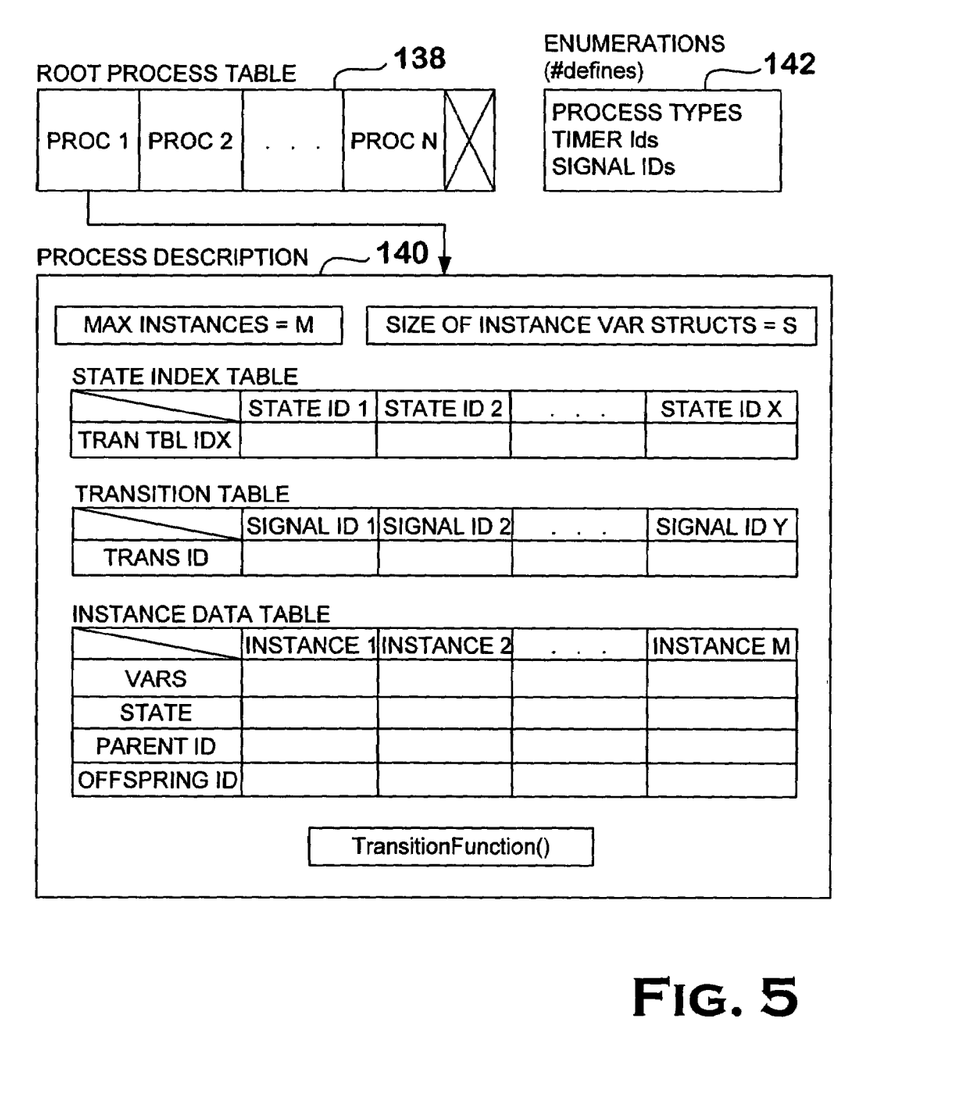
FIG. 5 is an illustration of the structure of SDL C MICRO generated data types.

Analyze & generate code (only)
Code generator: C-micro
Prefix: Full
Separation: Full
Capitalization: As defined The code generated by SDT consists mainly of data structures. The only pieces that translate to operational code are the transition functions associated with each process. The structure of the generated data types is represented in FIG. 5.

The root process table 138 is a global array, sized to the maximum number of process types in the system, plus one to allow for an end marker. This array is composed of process description block entries, one for each process type in the SDL system. The contents of each process description 140 are static variables, placed in the process's source file, along with the transition function. The root process table 138 is placed in the system source file.

Figure 6:
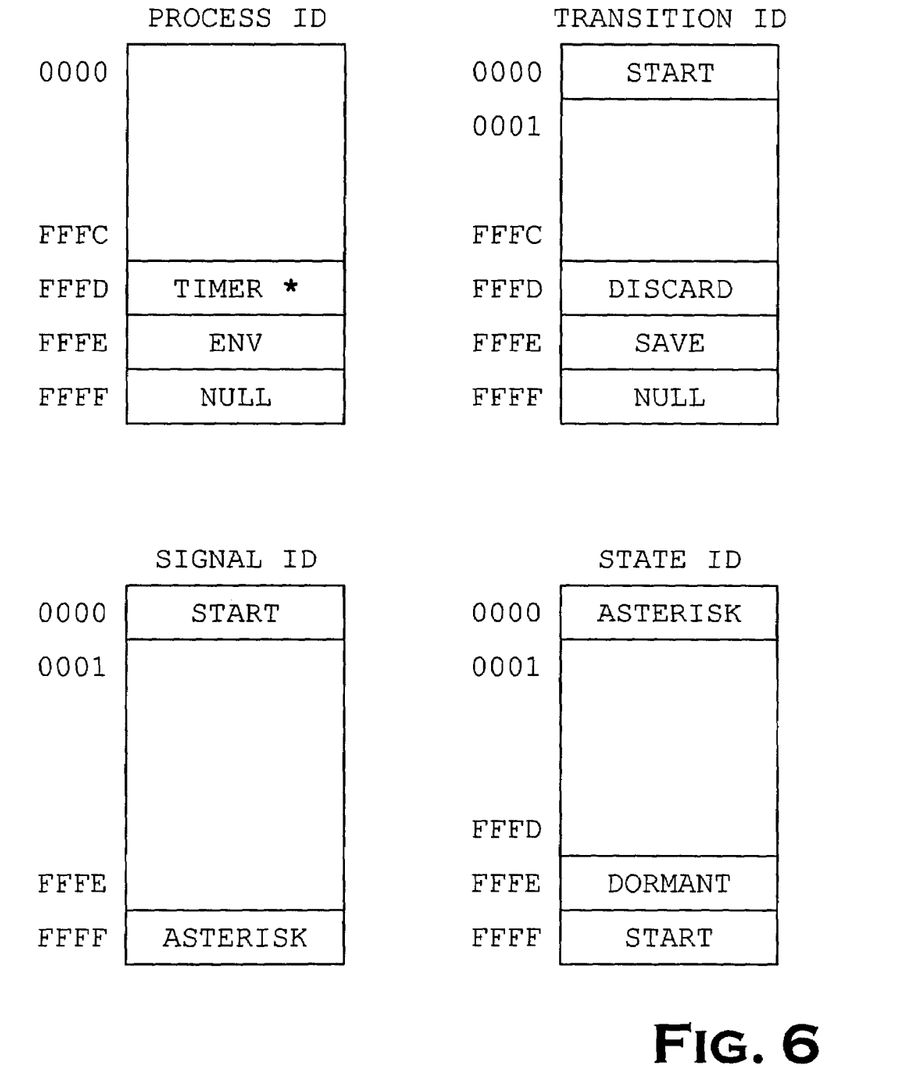
FIG. 6 is a list of preferred reserved SDL process identities.

The enumerations (process type and timer/signal IDs) are placed in header files 142. Process types are preferably numbered beginning at 0. To accommodate multiple instances of a single process type running in the system, an instance number is combined with the process type to come up with the process ID, or PID. Instance numbers begin at 0. Timer ID's and signal ID's share a common enumeration. Timers ID's are defined first, beginning at 1 (0 is reserved for the Start signal). FIG. 6 is a list of preferred reserved IDs.

An SDL system can be partitioned using either automatic or manual partitioning. Automatic partitioning is accomplished preferably via an SDT build script. When the system is partitioned, send-via signals that cross a partition's boundary get translated into signals that are sent-to an "environment" SDL process. The identity of the true intended recipient is lost. Enough information may be available in the SDT-generated PR file to construct a mapping table (signal ID+sending process ID=destination process ID), which the environment process could use to forward the signals. However, this imposes more restrictions on the design of the system and adds extra hops to the signal's route.

Manual partitioning is done after code generation. A copy is made of the system source file, and the two are edited. The root process table entries for processes not in the partition are replaced with null entries. Next, the files are grouped according to partition and compiled using an appropriate make file. Full separation is required during the code generation step so that this grouping can occur. The main drawback to manual partitioning is the need to edit a generated code file. However, it produces more efficient code, and it does not impose limitations on the system.

For SDL system startup, each partition within the SDL system is compiled into a single executable (exact form is both OS and HW platform dependent). At startup, the partition's "main" (main thread) loops through the root process table 138. Each non-null entry represents a local process type. The process description 140 for each process type contains an instance data table, sized to the maximum number of instances of the type that can be running simultaneously in the system. A thread group is created, containing a synchronized thread for each possible process instance. A process control block is created for each instance, containing the process ID and a pointer to the process description. A pointer to the process control block is passed to the thread so that it has scoped access to its own information.

Figure 7:
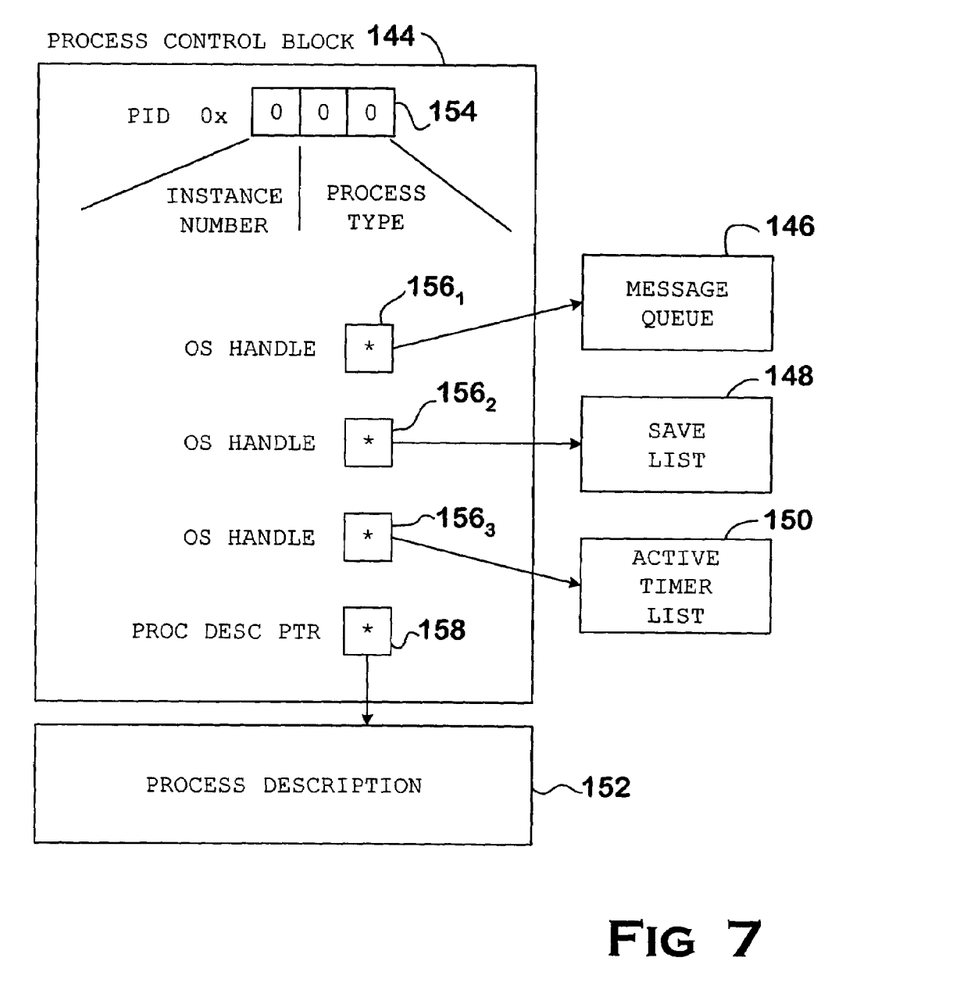
FIG. 7 illustrates the format of an SDL process control block.

FIG. 7 illustrates the format of a Process Control Block. The data type and its associated table are extensions to C MICRO to support tight integration to the OS API. The process control block 144 has a PID 154, OS handles $156_1$ to $156_3$ and a process description pointer 158. One OS handle $156_1$ points to a message queue. Another OS handle points to a save list 148 and another $156_3$ to an active timer list 150. The process description pointer 158 points to a process description 152.

FIG. 7 illustrates the format of a Process Control Block. The data type and its associated table are extensions to C-Micro to support tight integration to the OS API. The process control block 144 has a PID 154, OS handles $156_1$ to $156_3$ and a process description pointer 158. One OS handle $156_1$ points to a message queue. Another OS handle points to a save list 148 and another $156_3$ to an active timer list 150. The process description pointer 158 points to a process description 152.

For SDL signal inputs, each SDL process instance runs in its own operating environment thread. Its responsibility is to receive and react to signals. Signals are received in messages through the thread's associated message queue. There are three ways an SDL process may react to a signal: discard it, save it for later, or initiate a state transition.

Once a signal has been identified as the current signal, the SDL process decides how to react to it. The framework for processing a signal resides in the porting layer and uses data accessed through the process control block 144. The following is the processing of the signal.

Figure 8:
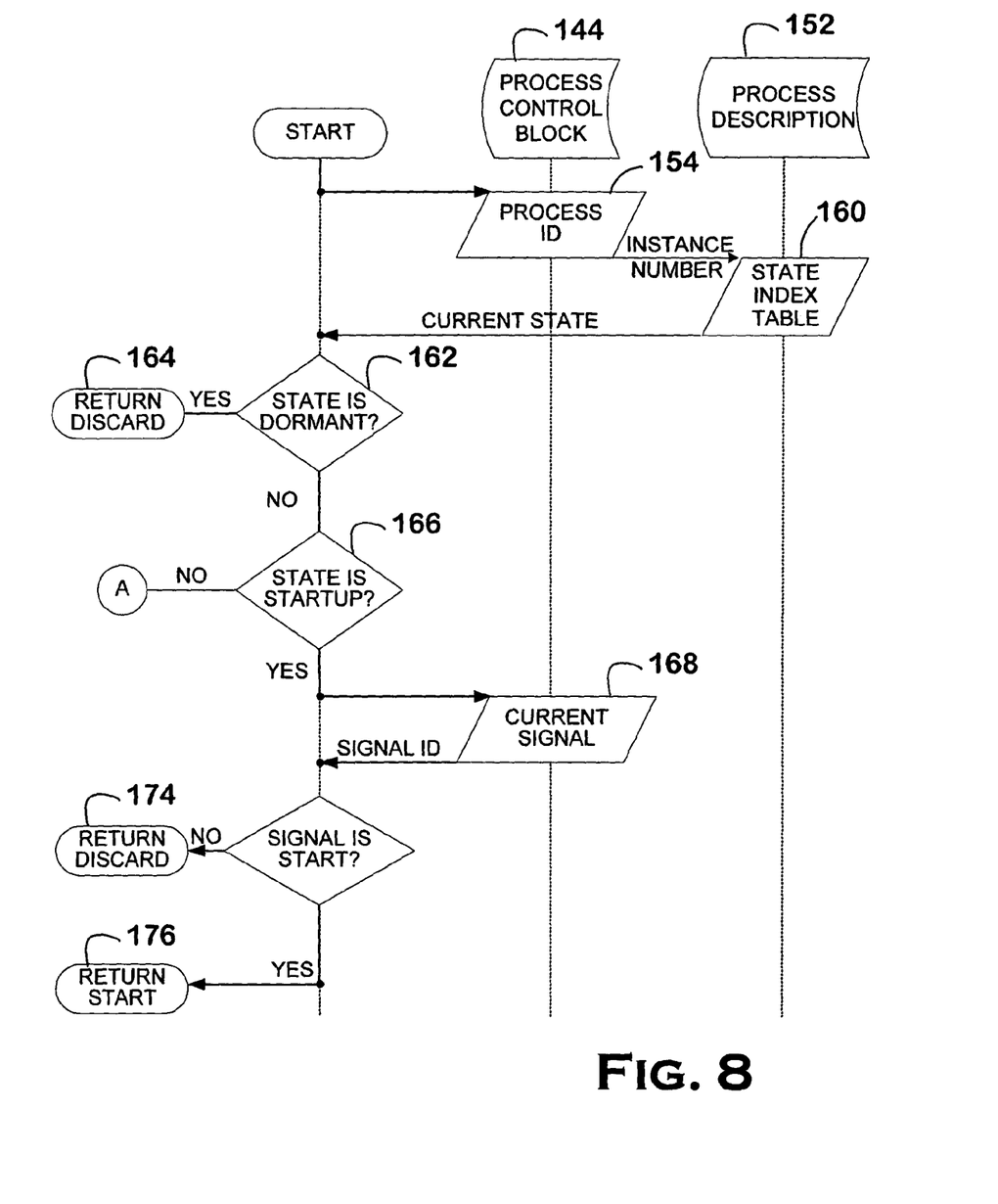
FIGS. 8, 9 and 10 are flow charts of a signal identity translated into a transition identity within the SDL porting layer.
Figure 9:
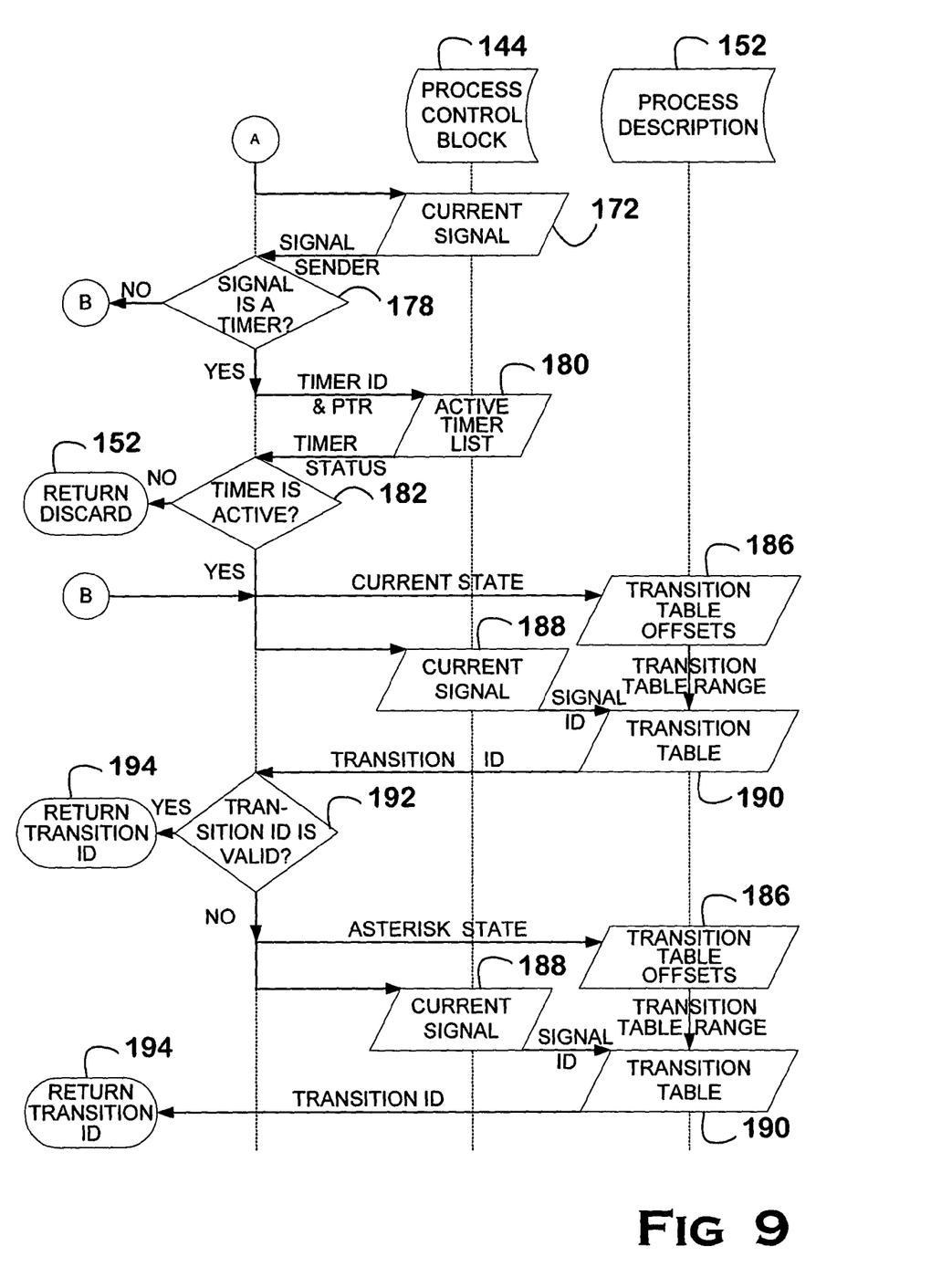
Figure 10:
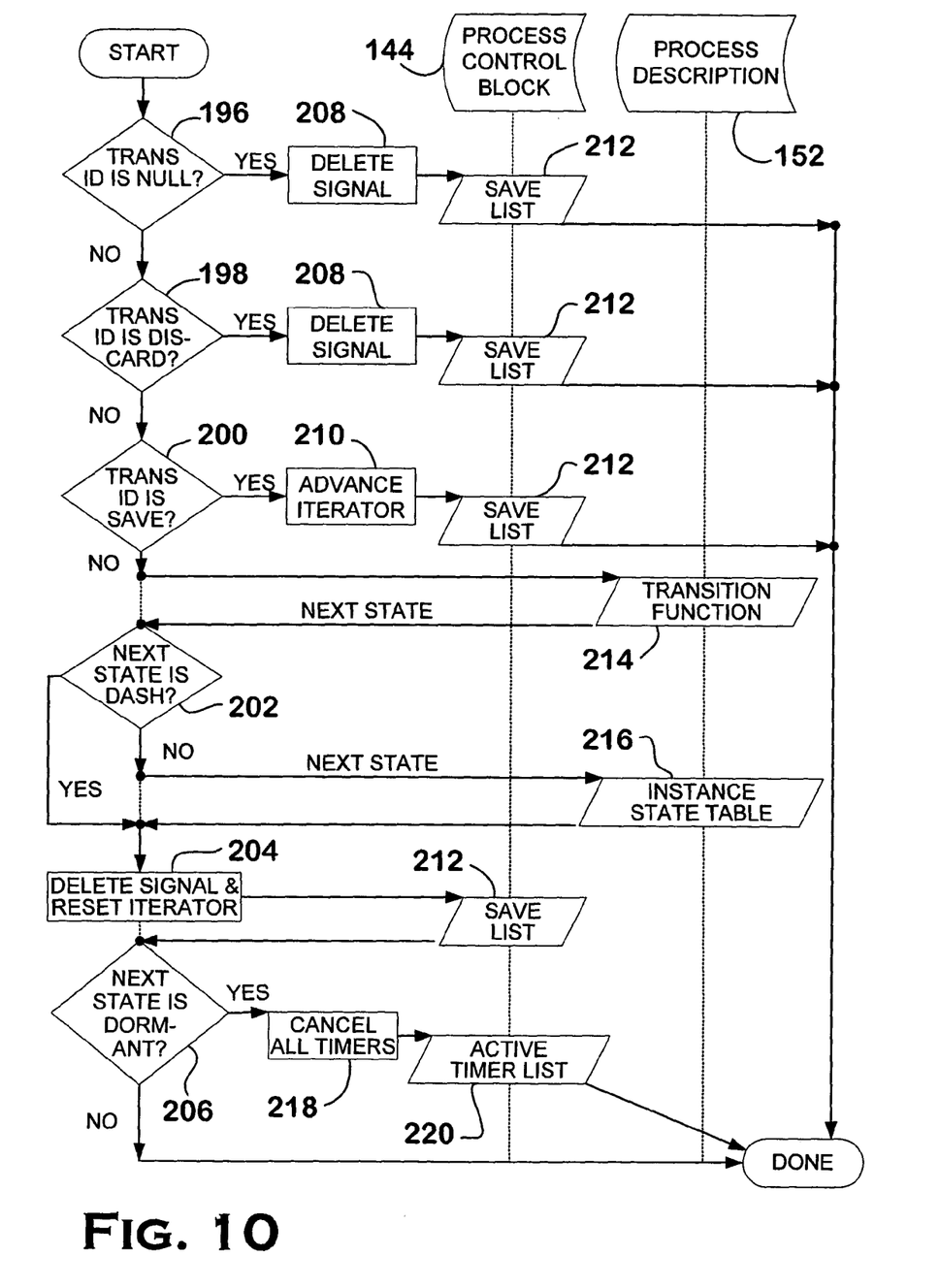

As illustrated in the flow chart of FIGS. 8, 9 and 10, the signal ID is translated into a transition ID. The process ID 154, stored in the process control block 144, provides the instance number. The instance number is used to index into the state index table 160 in the process description 152, and finds the current state. If the current state is Dormant 162, the transition ID is set to discard 164. If the current state is Start and the signal ID is Start, 166, 170, the transition ID is set to Start and the process returns to Start, 176. Any other signal received while in the Start state results in a transition ID of Discard, 174.

If the current state is neither Dormant nor Start, the signal is checked to see if it represents a timer, 178. When a timer is set, the sender ID of the signal is set to a reserved Timer process value, and an entry is added to the active timer list 180. If a timer is cancelled, its entry is removed from the list. If a signal 172 is received whose sender has been set to the reserved Timer process value, it is identified as a timer signal. If an entry for that timer is found on the active list 180, 182, the entry is removed and processing continues. If it is not found, the timer is invalid, and the transition ID is set to Discard, 184.

If the transition ID has not yet been set, the expected signals 188 for the current state are checked. In the state index table, each state maps to an index into the transition table, 190, where the signals expected in that state begin. The transition table entries are state-ordered the same as the state index table, so by also using the subsequent state's index, a range of indices into the Transition Table 190 is obtained. Within this range, if a signal ID is found that matches the current signal 188, or if the Asterisk signal ID is defined for this state, the corresponding transition ID is taken, 194.

If a valid transition ID has still not been found, the Asterisk State is checked. If the Asterisk State is defined for this process, the first entry in the state index table is not a 0, since the Asterisk state entries in the transition table come first. Therefore, this bottom range is checked the same as the current state.

If the transition ID is Discard, 198, or if all attempts to obtain a valid transition ID fail, a Null, (the signal is unexpected), the signal is discarded, 208. If the transition ID is "Save", 200, the signal is saved via advance itorator 210, (on the save list 212). All other transition ID's are fed into the process description's transition function 214, the behavior of which is defined in SDL, and a new state ID is returned.

If the new state is not Dash, 202, the instance state table 216 is updated to the new state. If the new state is Dormant, 206, all active timers are cancelled, 218, 220. The save list 212 and the message queue are not flushed, 204, but are handled through normal processing. If the process is quickly started again, this may result in stale signals reaching the new process (since Start signals are sent with High priority and could jump ahead of stale signals in the queue). However, this is preferable to mistakenly discarding signals intended for the new process.

For signal output, SDL processes send signals from within the transition function. A connection is acquired to the destination message queue. Since opening and closing a connection to a message queue each time a message is put on it is undesirable, connections are opened as needed, and kept in a shared area for all threads in the process to use until system shutdown. This is accomplished via a lookup function, provided by the OS abstraction layer 122.

Timers can be set by an SDL process. When a timer goes off, it is received and processed as a signal. An SDL process can also cancel timers. Once a timer has been cancelled, it should not appear on the incoming message queue.

What is claimed is:

1. A wireless communication device comprising:
   a system processor;
   a communication processor;
   a communication module, in communication with the system processor and the communication processor to facilitate communication between the system processor and the communication processor; and
   a shared memory associated with the communication module;
   wherein the system processor is configured to receive variables from a single thread in a single threaded operating environment, port the received variables via a porting layer for use in a multiple threaded environment wherein the porting the received variables into the multiple threaded operating environment is performed by reference such that each of an independent thread can access variables by reference without stopping on another independent thread's variable.

2. The wireless communication device of claim 1, further comprising a single threaded modeling tool configured to generate code from a software model, wherein the single threaded modeling tool produces variables as global variables and not using the global variables in operation of a plurality of threads in the multiple threaded operating environment.

3. The wireless communication device of claim 1 wherein the porting layer comprises a root process table having process description block entries, each process in the process description block entry having static variables.

4. The wireless communication device of claim 2, further comprising an SDL modeling language used in the software development and wherein the single threaded modeling tool is TELELOGIC TAU C MICRO with light integration.

5. The wireless communication device of claim 1 wherein the wireless communication device is a wireless transmit/receive unit.

* * * * *